Dec. 17, 1929.    R. G. CRITTAL ET AL    1,740,336
HEATING AND COOLING OF BUILDINGS
Original Filed Sept. 20, 1923
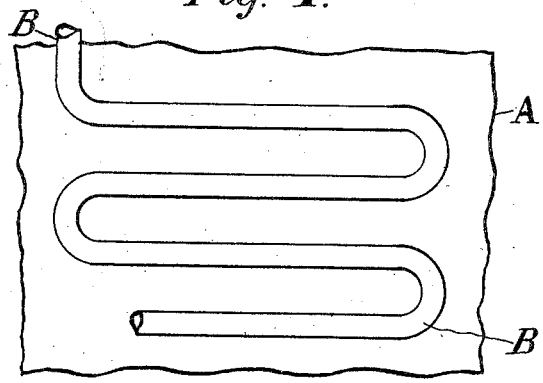
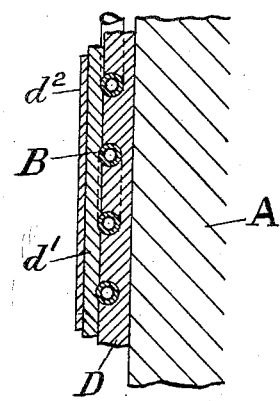
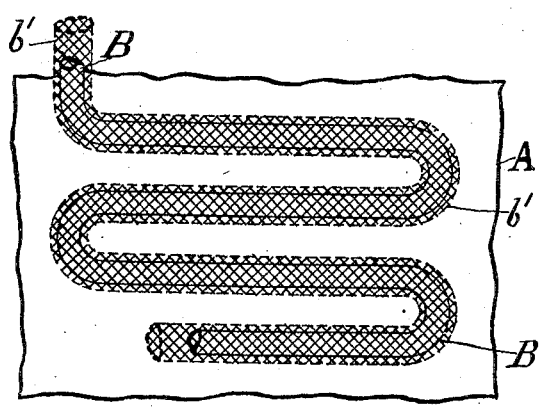
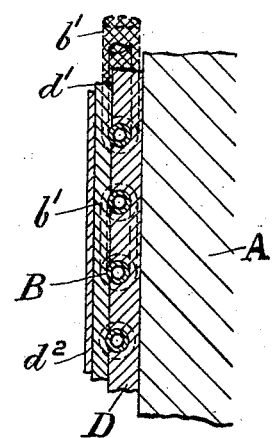
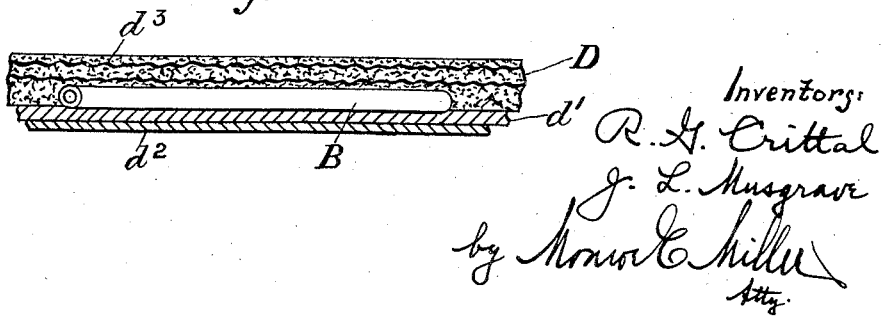

Patented Dec. 17, 1929

1,740,336

UNITED STATES PATENT OFFICE

RICHARD GODFREY CRITTAL AND JOSEPH LESLIE MUSGRAVE, OF LONDON, ENGLAND

HEATING AND COOLING OF BUILDINGS

Original application filed September 20, 1923, Serial No. 663,861, and in Great Britain November 10, 1922. Divided and this application filed June 22, 1926. Serial No. 117,773.

This invention refers to that system of heating or cooling buildings in which the heat or cold radiates from the surface of the wall, floor or ceiling, and has particular reference to the circulation of a heating or cooling fluid as applied to partitions or party walls, floors and ceilings, this application being a division of application Serial No. 663,861, filed Sept. 20, 1923.

One object of the invention is to overcome the difficulties of expansion and contraction and to prevent cracking or fracture of the surface from which the heat radiates, by using pipes or tubes of a flexible nature, such as lead or composite, instead of pipes of a rigid or inflexible nature for circulating the heating or cooling fluid. These pipes are laid in coils against the structure to which they are secured and are then covered or partially embedded in the material of the wall upon which the plaster is laid, such plaster entirely embedding said pipes and forming the surface from which the heat radiates, so that provision against cracking or fracturing of such surface is desirable.

Another object of the invention is to entirely or partially surround the pipes with expanded metal or other flexible reinforcing material before being fixed to the structure, so that when said pipes are embedded in the material of the wall and covered with plaster, the expanded metal or reinforcing material acts as a binder to assist in avoiding the cracking or fracturing of the radiating surface, as well as assisting in distributing the heat or cold.

It will be readily understood that the resistance offered by the material in which the pipes are embedded will, by reason of the flexible nature of the metal, cause such metal when heated to compress, thus obviating the necessity for providing means to compensate for expansion and contraction, and consequently avoiding the liability of the plaster or surface of the structure from which the heat radiates cracking or splitting.

Instead of entirely covering the flexible pipes with plaster they may be partially or entirely embedded in concrete during the construction of a floor, wall or ceiling, leaving the surface plain or covering it with cement, plaster, tiles, marble, glass, paper or any suitable wall covering.

The invention is illustrated in the accompanying drawing, wherein—

Figure 1 is a broken front elevation showing a coil of flexible pipes fixed to the wall or structure.

Fig. 2 is a sectional end elevation showing a coil of flexible pipes fixed against the wall and embedded in the material of the wall and covered with plaster or material from the surface of which the heat radiates.

Fig. 3 is similar to Fig. 1 showing the coil of flexible pipes enclosed or surrounded by a metallic reinforcing material.

Fig. 4 is a view similar to Fig. 2 showing the coil of flexible pipes enclosed in a reinforcing material embedded in the material of the wall.

Fig. 5 is a broken sectional view showing a coil of flexible pipes embedded in reinforced concrete with the surface covered with plaster or other material.

In the drawing A represents the structural part of the building, B the coil of flexible pipes, $b'$ the expanded metal or other reinforcing material with which the coil B is surrounded, D the concrete or other material in which the coil B is embedded, $d'$ the rendering cement or material with which the coil is covered, and $d^2$ the finished surface or plaster from which the heat radiates.

The coil or coils of flexible pipes B are fixed to the structure A by any suitable means. These pipes, which may or may not be surrounded with expanded metal $b'$ or other flexible reinforcing material, are then embedded in concrete D or other material forming the wall so as to leave the surface of such pipes exposed, and afterwards covered over or rendered with cement $d'$ and then faced with the finishing plaster $d^2$, or covered with tiles, marble, glass, or other suitable wall covering from the surface of which the heat radiates.

If desired the concrete may be reinforced with expanded metal $d^3$ as shown in Fig. 5.

The expanded metal or other reinforcing material not only assists in preventing the cracking or fracturing of the concrete and plaster or other material, but also assists in conducting the heat from the pipes, so as to distribute the heat. The expanded metal surrounding the pipes in tubular form is particularly advantageous in taking up the strains due to the expansion of the pipes.

Having thus described the invention, what is claimed as new is:—

1. In a building, the combination with a concrete surfacing structure, of a pipe for the flow of a heating or cooling fluid therein to heat or cool the interior of the building and embedded in the concrete of said structure near the surface thereof, and reinforcing material surrounding and spaced from said pipe in tubular form and embedded in the concrete.

2. In a building, the combination with a concrete surfacing structure, of a pipe for the flow of a heating or cooling fluid therein to heat or cool the interior of the building and embedded in the concrete of said structure near the surface thereof, and expanded metal embedded in the concrete and surrounding and spaced from said pipe in tubular form.

3. In a building, the combination with a concrete surfacing structure, of pipes for the flow of a heating or cooling fluid therein to heat or cool the interior of the building and embedded in the concrete of said structure near the surface thereof, said pipes being composed of lead or equivalent material, and reinforcing material embedded in said concrete and surrounding and spaced from said pipes in tubular form.

4. In a building, the combination with a concrete surfacing structure, of a coil for the flow of a heating or cooling fluid embedded in said structure near the surface thereof, and tubular reinforcement extending along, surrounding and spaced from the portions of said coil and embedded in the concrete.

In testimony whereof we hereunto affix our signatures.

RICHARD GODFREY CRITTAL.
JOSEPH LESLIE MUSGRAVE.